United States Patent [19]

Ljungcrantz

[11] Patent Number: 5,016,690

[45] Date of Patent: May 21, 1991

[54] DOSING DEVICE ON A FILLING PLANT, IN PARTICULAR FOR LIQUID AND PASTY PRODUCTS, AND PROCESS FOR ITS OPERATION

[76] Inventor: Billy Ljungcrantz, Brunnmattstrasse 40, 3007 Bern, Switzerland

[21] Appl. No.: 523,267

[22] Filed: May 11, 1990

Related U.S. Application Data

[63] Continuation of Ser. No. 221,513, filed as PCT CH87/00141 on Oct. 13, 1987, published as WO88/02721 on Apr. 21, 1988, abandoned.

[30] Foreign Application Priority Data

Oct. 14, 1986 [CH] Switzerland ............... 4092/86

[51] Int. Cl.[5] ................ B65B 1/00; B65B 3/04
[52] U.S. Cl. .................. 141/242; 141/243; 141/183; 222/219
[58] Field of Search ........... 141/98, 183, 237, 242, 141/243, 248, 286; 222/138, 217, 218, 219, 271, 284, 288, 434

[56] References Cited

U.S. PATENT DOCUMENTS

| | | | |
|---|---|---|---|
| 540,257 | 6/1895 | Jones | 222/219 |
| 1,763,487 | 6/1930 | Taylor | 222/217 |
| 1,861,734 | 6/1932 | Bergmann | 141/286 |
| 1,867,998 | 7/1932 | Benson | 222/219 |
| 1,990,926 | 2/1935 | Bergmann | 141/286 |
| 2,540,741 | 2/1951 | Krueger | 141/57 |
| 2,727,657 | 12/1955 | Bagby | 222/219 |
| 2,893,609 | 7/1959 | Spiess, Jr. et al. | 222/219 |
| 3,125,136 | 3/1964 | Miller et al. | 222/219 |
| 3,387,748 | 6/1968 | Brenchley | 222/219 |
| 3,394,850 | 7/1968 | Volkober | 222/219 |
| 3,695,486 | 10/1972 | Warner | 141/242 |
| 3,874,430 | 4/1975 | Lansdale | 141/116 |
| 4,094,124 | 6/1978 | Ljungcrantz | 53/29 |
| 4,258,876 | 3/1981 | Ljungcrantz | 229/43 |
| 4,464,154 | 8/1984 | Ljungcrantz | 493/87 |
| 4,662,521 | 5/1987 | Moretti | 206/484.2 |
| 4,778,079 | 10/1988 | Judex | 141/243 |

FOREIGN PATENT DOCUMENTS

| | | | |
|---|---|---|---|
| 67437 | 1/1948 | Denmark | 222/218 |
| 0216975 | 4/1987 | European Pat. Off. | |
| 3606712 | 9/1987 | Fed. Rep. of Germany. | |
| 806316 | 12/1936 | France | 222/219 |
| 1561617 | 3/1969 | France. | |
| 2014114 | 3/1969 | France. | |
| 2328949 | 3/1972 | France. | |
| 2097131 | 5/1977 | France. | |
| 56262 | 5/1944 | Netherlands. | |
| 8900042 | 9/1989 | PCT Int'l Appl. | |

Primary Examiner—Henry J. Recla
Assistant Examiner—Keith Kupferschmid
Attorney, Agent, or Firm—Marks, Murase & White

[57] ABSTRACT

The dosing device is provided with a storage container (1), in which is located a shaft (3) under the filling height of the product (23). The shaft has at least one bore (5), in which a bilaterally operating piston (6) is depressed by a driven actuating shaft (10) which can be adjusted for length, which enables the desired dosing volume to be obtained. The product arrives into a container via a shut-off valve (8). During operation of this dosing device, the actuating system (10) is raised in the lowest position of the piston, as a result of which the bore is filled with product and the shaft turned by a switchgear motor (4) through 180°, after which the piston during its downward travel ejects the volume contained in the bore. This dosing device allows a high filling frequency, precise and simple adjustment of the volume of the individual dosing units, highly aseptic filling and easy cleaning.

18 Claims, 2 Drawing Sheets

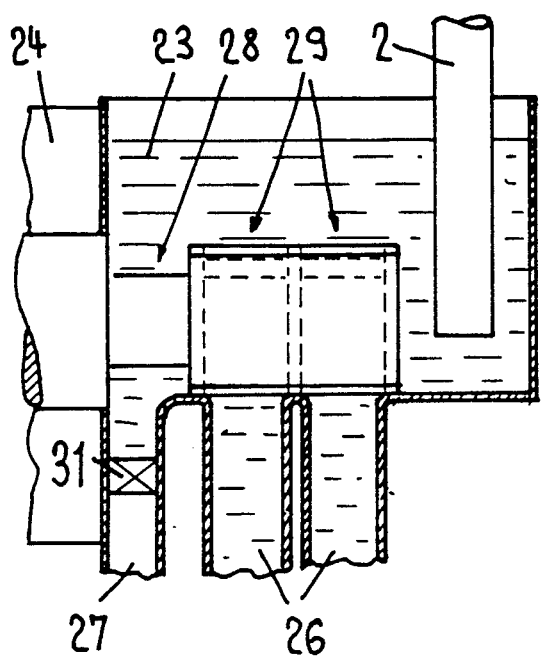
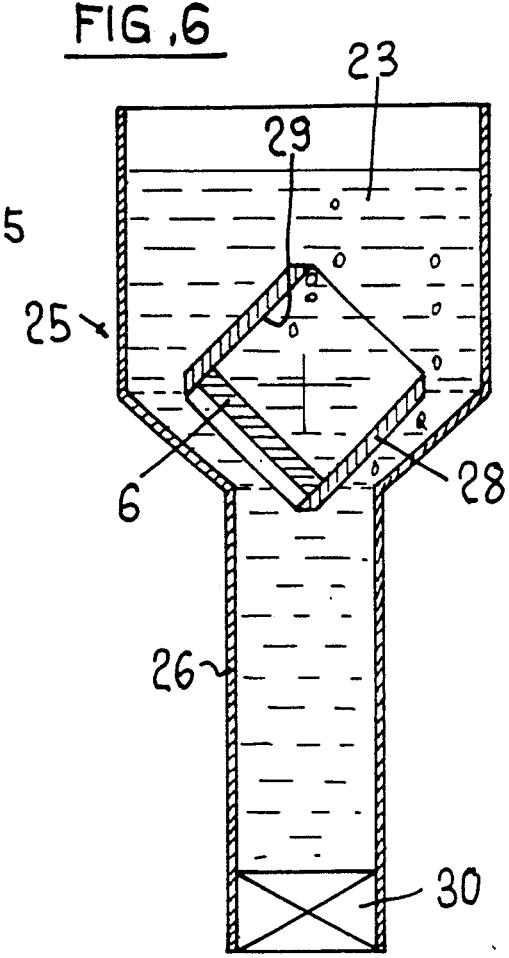
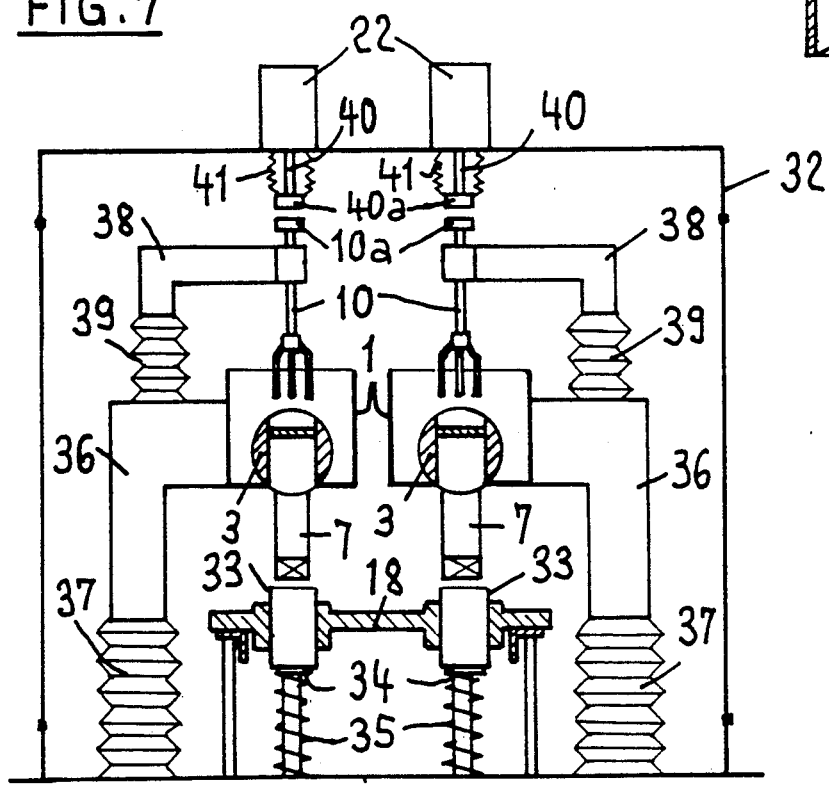

DOSING DEVICE ON A FILLING PLANT, IN PARTICULAR FOR LIQUID AND PASTY PRODUCTS, AND PROCESS FOR ITS OPERATION

This application is a continuation of application Ser. No. 07/221,513, filed as PCT CH87/00141 on Oct. 13, 1987, published as WO88/02721 on Apr. 21, 1988, now abandoned.

A large number of dosing devices for liquid or pasty products are known, such as, for example, those according to Swiss Patent Specification Nos. 540 478 or 555 043, wherein these dosing devices operate by means of an extensible bellows, and the entire outlet valve is moved upwardly and downwardly, the stroke determining the volume of the product to be introduced. During filling of the dosing chamber, an inlet valve is opened and the outlet valve is closed, as a result of which the bellows is extended, whereas, during emptying, the inlet valve is closed and the outlet valve is opened and the bellows chamber is contracted. Apart from the problems relating to dosing accuracy as a consequence of using a bellows chamber, the maximum frequency is limited because, in order to fill the bellows chamber with the dosing volume, this chamber has to be moved downwardly and the operation takes a relatively long time.

No. DE-B-2 218 864 describes a dosing device utilising a rotary slide valve for bottling milk, the device having a housing, which is connected to a liquid reservoir and is provided with a cylindrical through-bore, the hollow rotary slide valve alternately providing a connection with the liquid reservoir, then closing it again. Such a dosing device does in fact permit a relatively high filling frequency, but it is only suitable for liquids and is not suitable for pasty products or for liquids which contain solids, such as yoghurts, soups or the like. U.S. Pat. No. 3,874,430 discloses a dosing device which operates by means of a vertically operating dosing piston, the shut-off valve being formed by a horizontally mounted shaft which is provided with a through-bore, through which the liquid passes into a filler head, provided with a shut-off valve, when this bore is in a suitable position. This dosing device has a relatively large number of component parts and is only suitable for liquids.

By comparison, the present invention seeks to provide a dosing device which has a simple construction, allows aseptic filling and simple adjustment for a precise dosing volume for each individual dosing unit and, above all, permits a high filling frequency. Such a dosing device is described in the claims.

The invention is explained more fully hereinafter with reference to a drawing of embodiments.

FIG. 5 is a schematic, longitudinal sectional view through a second embodiment of a dosing device according to the invention;

FIG. 6 is a sectional view through the dosing device of FIG. 5; and

FIG. 7 is a schematic view of the dosing device of FIG. 5 in a second embodiment of a filling plant.

Figure 1:
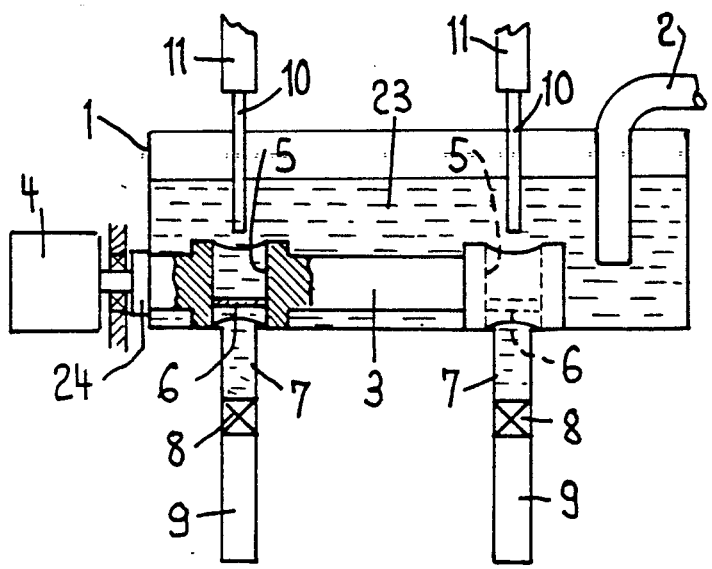
FIG. 1 is a schematic, longitudinal sectional view through a first emodiment of a dosing device according to the invention.
Figure 4:
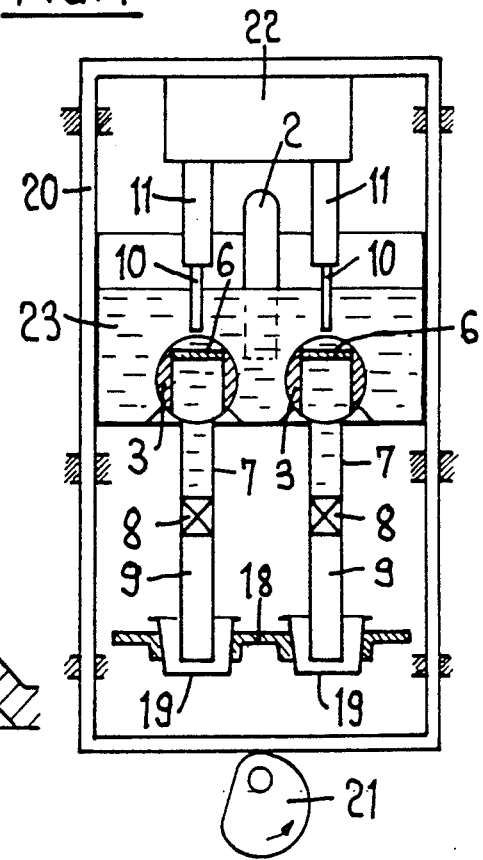
FIG. 4 is a schematic view of the dosing device of FIG. 1 forming part of a filling plant.

The dosing device of FIG. 1 is provided with a storage container 1, which is fed by fixed feedpipe 2 in such a manner that the level of the product 23 is always situated above the shaft 3. The shaft 3, which is driven by a switchgear motor 4, has one or a plurality of cylindrical through-bores 5—two in the present case—which, together with the stroke of the bilaterally operating piston 6, produce the dosing volume. The outlet pipe 7 is provided with a shut-off valve 8, known per se, and discharges into a filler nozzle 9. The actuating shaft 10 for the piston 6 is actuated by a suitable drive 22, which is shown in FIG. 4, the stroke of this shaft being adjustable. Actuating shaft 10 is vertically adjustable in an adjustment device 11 in order to determine the stroke of the piston. Adjustment device 11 is for calibrating and adjusting individually the stroke of the piston and thus the volume of the dose. As is apparent from FIG. 2, a plurality of shafts 3—two in the present example—can be disposed adjacent one another and are driven simultaneously by the switchgear motor 4 which is provided with a suitable transmission unit. Both the actuating shafts 10 and the shaft 3 are mounted in a suitable manner, though details thereof are not shown in the schematic views and are known per se. As a rule, the motor 4, the transmission unit and the mounting are provided outside the housing, and it is advantageous for a vapour lock 24 to be disposed between these component parts and the interior of the housing.

Figure 3:
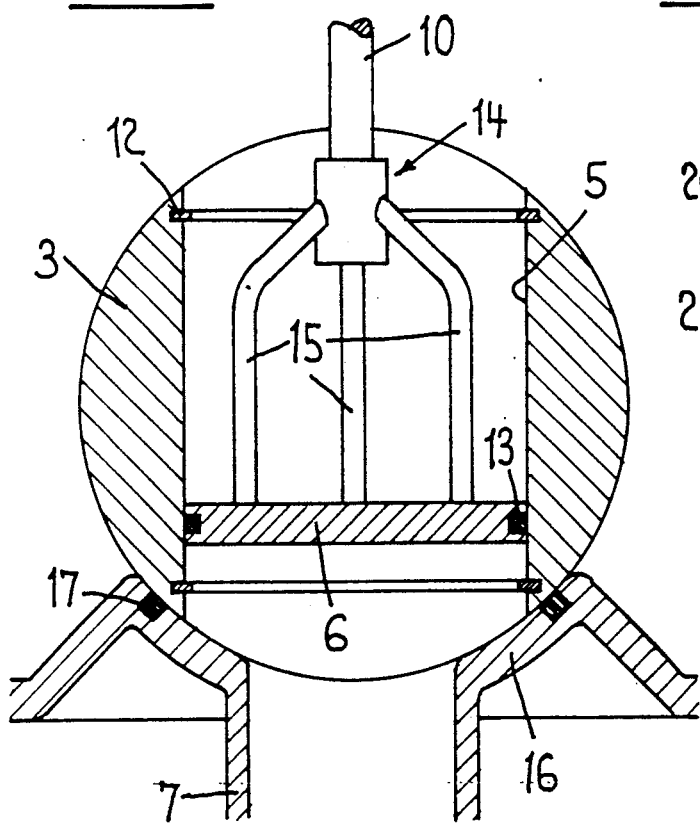
FIG. 3 is a sectional view through an enlarged portion of FIG. 2.

In the enlarged detail of FIG. 3, the rotatable shaft 3 is shown with the bore 5 in which a securing ring 12 is inserted at the top and bottom ends in order to ensure the upward and downward travel of the piston 6. Instead of a ring, three pins may also be used. The piston itself has a seal 13. An actuating stand 14 is secured to the lower end of the actuating shaft 10 and has three legs 15 which act directly on the piston 6. This tripod arrangement, on the one hand, permits the shaft assembly to be light in weight and, on the other hand, permits the piston to be actuated without any risk of tilting or jamming. The shaft 3 is retained by means of a mounting 16 which is provided, on each side of the outlet 7, with a seal 17 which may be provided either on the shaft or on the mounting, but it may also be omitted.

The mode of operation of this dosing device is as follows: In the position shown in FIG. 3, the piston has been driven downdwardly almost completely, i.e. almost the entire dosing volume has been ejected. After the bottom position has been reached, the actuating shaft 10 is raised with the tripod 14, so that the lower surfaces of the legs are located above the external periphery of the shaft 3. Subsequently, the shaft 3 is turned through 180°, and the piston is now situated in its highest position. During this operation, the dosing volume is simultaneously filled. Thereafter, the actuating shaft 10 is lowered and the piston is thereby pushed into its lowest position. The product then passes through the shut-off valve 8 into the filler nozzle 9 and thence into the container intended therefor.

As is clearly apparent from the drawing, the storage container 1 can be sealed very easily, so that a completely aseptic filling can be achieved with relatively simple means. Moreover, it follows from the above description that a high filling frequency can be achieved, since the dosing bores are quickly filled during each dosing stroke, a turn can be rapidly executed, and the actuating shaft, with the tripod, and the piston constitute a small mass which can be easily accelerated without excessive force being applied. More than four bores or dosing units per device may of course be provided in order to achieve a higher filling volume. If solids are to be added to the liquid or pasty mass, it is very easy to do so. When the piston is depressed, a suction effect is produced, and the desired amount of solid particles can then be introduced prior to rotation through 180°. Solid substances can easily be added if the actuating stand and shaft are formed from pipes, through which the solids can be conducted into the dosing volume. It is also possible, of course, to provide a suitable, separate conduit therefor. It is additionally found that the pressure exerted upon the product is very low and, in consequence, gentle handling is thereby possible. Adjustment device 11 permits calibration and adjustment of the stroke of the piston and thus the volume of the dose. As a result of the individual calibration, i.e. the calibration of each individual dosing unit, a very precise dosing volume can be set. Finally, the entire dosing device is easy to clean. The dosing device is in fact especially suitable for liquid and pasty products, yet it is also possible to use it for powders or other solid substances. In addition, another supporting stand may be envisaged instead of a tripod.

Figure 2:
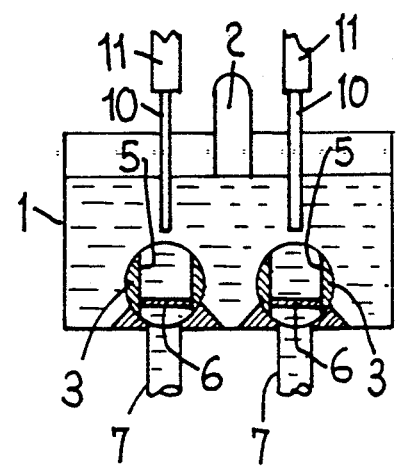
FIG. 2 is a sectional view through the dosing device of FIG. 1.

FIG. 4 shows the dosing device as part of a first embodiment of a filling plant. In addition to the component parts of the dosing device which are shown in FIGS. 1 to 3, a conveyor system is illustrated for conveying the containers 19, both the conveyor system and the containers here only being moved horizontally. The entire dosing device is secured to a stand 20 which can be moved upwardly and downwardly by a cam plate 21 with respect to the plane of the conveyor system. In such a case, the stand with the dosing device or with the filler nozzle 9 is raised during the filling operation so that the filling is always effected below the product level, except at the very beginning. With some liquids, this arrangement prevents air from mixing therein and accelerates rapid filling. Instead of securing the entire dosing device to a stand which is upwardly and downwardly displaceable, it is also possible to provide a stand with telescopic columns, whereby the piston rods and the filler nozzle move in opposite directions, and these two movements can be effected via a suitably controlled drive.

FIGS. 5 to 7 show a second embodiment of a dosing device and a portion of a filling plant which has a particularly compact construction. In FIG. 5, the fixed pipe 2, the drive which is only indicated schematically and is provided with the switchgear motor, and the interposed vapour lock 24 are the same as in the first embodiment, whereas the storage container 25, which is adapted to a compact construction, discharges, at its bottom end (see FIG. 6), into the outlets 26, which are integrally connected thereto, and possibly into a pipe 27 for the removal of air from the storage container. In this example, the shaft 28 is provided with two cylindrical bores 29 and, for space-saving reasons, the external form follows the two bores so that the configuration of the shaft resembles a figure "8" at the location of the two bores. The bores are provided with the same securing means, i.e. securing ring or pins, as in the preceding example, and the bilaterally operating piston 6 is also the same as in the preceding example. In contrast to the first embodiment, the shaft is not sealed from the outlet, so that the liquid 23 to be bottled passes to the shut-off valve 30, with the result that the shaft turns completely in the stored liquid. The shut-off valve at the end of the outlet is formed, in known manner, as a spring-loaded valve. A prior known valve 31, suitable therefor, is also disposed in the air-discharge pipe 27. When the shut-off valve is suitably formed, it is also possible to operate the dosing device without an air-discharge pipe and an air-discharge valve.

In a modified embodiment, it is also possible to dispose the outlet pipes 26 eccentrically relative to the cylindrical bore 29 instead of concentrically therewith, in order to save even more space, whereby the diameters of the outlet pipes may differ from one another depending on the intended use, i.e. smaller diameters for liquids which are not very sensitive, since the flow rate increases with smaller diameters during the ejecting operation. The second embodiment, which is shown in FIGS. 5 and 6, is particularly well suited to solving, in particular, the problems which arise with conventional plants, such as the problem associated with the removal of air and the compact construction. The compact construction of the dosing device is not primarily a problem relating to the space which the dosing device occupies, but above all it is a problem of the volume which, on the one hand, has to be cooled and, on the other hand, has to be kept sterile, and it is obviously desirable to keep this volume as small as possible. FIG. 7 shows that the device of FIGS. 5 and 6 can be assembled to form a very compact plant, i.e. having a small volume.

The housing 32 is shown, which surrounds the filling plant and through which all the component parts are guided by means of seals and vapour locks, i.e. inter alia the conveyor system 18 and the various passages for the displaceable component parts and the drives. In the present example, the containers 33 for receiving the substance to be decanted are located on a plate 34 which is upwardly and downwardly displaceable by the pressure of a spring 35. The dosing device is supported by a stand 36 which can be upwardly and downwardly displaceable, the component parts which slide in one another being sealed by a bellows 37. The legs of the stand 36 are sealed from the exterior of the housing 32. An upwardly and downwardly displaceable holder 38 is disposed on the stand 36, the component parts which slide in one another being also sealed by means of a bellows 39. The holder carries the tripod 14 and the actuating shaft 10, which component parts are the same as in the preceding example. The actuating shaft 10 is actuated via the holder 38. The upward movement of the tripod 14, which ultimately determines the dosing volume, can either be adjusted by adjusting the actuating shaft 10 with respect to the holder 38 or can be adjusted by a rod 40, which is actuated by the drive 22, via coupling elements 40a and 10a. The rod 40 is sealed from the externally mounted drive 22 and provided with a bellows 41. The adjustment may be effected through the intermediary of an electronic circuit and, in fully automatic plants, this upward movement can be adjusted constantly or periodically, in dependence on the filling volume. In this embodiment also, the container 33 is lowered with respect to the outlet during the filling operation, this lowering movement possibly being effected either by only raising the dosing device by means of the stand 36—whereby the containers remain horizontal in the same plane—or, contrary to the first example, by lowering the plates 34, when the dosing device is in a stationary position, or by a combined movement in opposite directions both of the stand and of the plates 34 carrying the containers.

As already mentioned in the first example, a filling plant may comprise four dosing units, i.e. two hollow shafts each with two cylindrical apertures, by it is also possible to use a different number of dosing units in a plant, for example, six, eight or an even higher or lower number.

I claim:

1. A dosing device on a filling plant, in particular for liquid and pasty products, having a product storage container having at least one outlet, a rotatable shaft disposed in said product storage container, said shaft being provided with at least one bore extending perpendicular to the longitudinal axis of said rotatable shaft, said bore being in vertical alignment with said outlet to allow said products to flow from said container through said bore and out of said container outlet, a bilaterally operable piston disposed in said bore, the stroke of said piston determining the desired volume of product to be dosed from the bore, an actuating stand which engages said piston, said actuating stand secured to an actuating shaft which moves the stand into and out of engagement with said piston, wherein said actuating shaft is vertically adjustable in an adjustment device in order to determine the stroke of said piston, and wherein said actuating stand is a tripod.

2. The device according to claim 1, further comprising securing means provided at each end of said bore for securing said piston in said bore.

3. The device according to claim 1, wherein a switchgear motor is engagable to drive said rotatable shaft through a predetermined angle.

4. The device according to claim 3, wherein a vapour lock is disposed between said switchgear motor and the interior of said storage container.

5. The device according to claim 1, wherein said outlet has a shut-off valve and a filler nozzle.

6. The device according to claim 1, further comprising a seal means disposed between said rotatable shaft and said outlet.

7. The device according to claim 1, wherein an outlet is provided for each of said bores and a shut-off valve is disposed at the end of each of said outlets.

8. The device according to claim 7, further comprising a seal means disposed between said rotatable shaft and said outlet.

9. A dosing device for adjustable metering and dosing liquid and pastry products comprising:
   a product storage container adapted to contain said product to be dosed having at least one outlet for dispensing said product out of said container;
   at least one rotatable shaft disposed in said product storage container and surroundable by said product, said shaft being adapted to be placed in a first position and a second position approximately 180° from said first position;
   at least one perpendicular bore communicating with said outlet extending through said rotatable shaft at a right angle to the longitudinal axis of said rotatable shaft, said bore having a first end and a second end in communication with the interior of said product storage container, wherein when said rotatable shaft is placed in said first position said first end is adapted to act as an entrance of said bore to permit said product to enter said bore and said second end is adapted to act as an outlet of said bore to permit said product within said bore to flow out of said bore and said container outlet and wherein when said rotatable shaft is placed in said second position said second end is adapted to act as an entrance to said bore permit said product to enter said bore and said first end is adapted to act as an outlet to said bore to permit said product within said bore to flow out of said bore and said container outlet;
   a driven bilaterally operating piston disposed in said bore, said piston having a first face and a second face;
   an actuating means for driving said piston, said actuating means comprising:
   an actuating shaft vertically positioned with respect to said bore and extending within said product storage container, said actuating shaft having a lower end and an upper end, wherein said lower end is adapted to intermittently extend into said bore to come in contact with the first face of said piston when said shaft is in said first position and the second face of said piston when said shafts is in said second position and drive said piston downwardly; and
   an actuating drive attached to said shaft to drive said shaft.

10. The device according to claim 9, wherein said actuating means further comprises an actuating stand secured to the lower end of said actuating shaft and adapted to come in contact with the respective face of said piston.

11. The device according to claim 10, wherein said actuating stand is a symmetrically actuated stand.

12. The device according to claim 11, wherein said symmetrically actuated stand is a tripod.

13. The device according to claim 10, wherein said actuating shaft and said actuating stand are formed from pipes.

14. The device according to claim 9, further comprising an adjustment device for adjusting the volume of product metered, said adjustment device adapted to vertically adjust the upper end of said actuating shaft to adjust the volume metered by changing the stroke of said piston.

15. A filling plant for filling containers with liquid and pasty products comprising:
   a conveyor system for receiving containers to be filled, said conveyor system being adapted to move in a horizontal plane;
   a product storage container in which said product to be dosed is disposed having at least one outlet for dispensing said product out of said container;
   at least one rotatable shaft disposed in said product storage container and surroundable by said product, said shaft being adapted to be placed in a first position and a second position approximately 180° from said first position;
   at least one perpendicular bore communicating with said outlet extending through said rotatable shaft at a right angle to the longitudinal axis of said rotatable shaft, said bore having a first end and a second end in communication with the interior of said product storage container wherein said first end is adapted to act as an entrance of said bore to permit said product to enter said bore and said second end is adapted to act as an outlet of said bore to permit said product within said bore to flow out of said bore and said container outlet when said rotatable shaft is placed in said first position and wherein said second end is adapted to act as an entrance to said bore to permit said product to enter said bore and said first end is adapted to act as an outlet to said bore to permit said product within said bore to flow out of said bore and said container outlet when said rotatable shaft is place in said second position;

a driven bilaterally operating piston disposed in said bore, said piston having a first face and a second face;

an actuating means for driving said piston, said actuating means comprising:

an actuating shaft vertically positioned with respect to said bore and extending within said product storage container, said actuating shaft having a lower end and an upper end, said lower end being adapted to intermittently extend into said bore to come in contact with the first face of said piston when said shaft is in said first position and the second face of said piston when said shaft is in said second position and drive said piston downwardly; and an actuating drive attached to said shaft to drive said shaft;

a filler nozzle disposed at the end of said outlet;

a stand to which said product storage container is secured; and means to raise said stand during the filling operation so that said filler nozzle is raised with respect to said containers to be filled.

16. A process for filling containers with liquid and pasty product using a dosing device comprising:

filling a product storage container with said product to be dosed;

moving a piston through a bore disposed in a rotatable shaft located in said product storage container by means of an actuating shaft so that the product is dispensed from said bore into a container to be filled;

rotating said bore approximately 180° by rotating said rotatable shaft; and moving said actuating shaft into said bore thereby engaging and moving said piston through said bore by means of said actuating shaft so that the product is dispensed from said bore into a second container to be filled.

17. Process according to claim 16, further comprising the step of regulating the stroke of the piston in each bore, by adjusting said actuating shaft of the drive of the actuating stand, so that the amount of product to be dosed is adjustable.

18. Process according to claim 16, further comprising the step of introducing solids during the downstroke of said piston.

* * * * *